(12) United States Patent
Take

(10) Patent No.: US 8,929,295 B2
(45) Date of Patent: Jan. 6, 2015

(54) RADIO EQUIPMENT AND RADIO BASE STATION

(75) Inventor: Masayuki Take, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 136 days.

(21) Appl. No.: 13/696,318

(22) PCT Filed: Apr. 14, 2011

(86) PCT No.: PCT/JP2011/059258
§ 371 (c)(1),
(2), (4) Date: Nov. 6, 2012

(87) PCT Pub. No.: WO2011/152131
PCT Pub. Date: Dec. 8, 2011

(65) Prior Publication Data
US 2013/0051329 A1 Feb. 28, 2013

(30) Foreign Application Priority Data
Jun. 4, 2010 (JP) ................................. 2010-128604

(51) Int. Cl.
*H04W 4/00* (2009.01)
*H04W 80/02* (2009.01)
*H04W 88/08* (2009.01)

(52) U.S. Cl.
CPC ............ *H04W 80/02* (2013.01); *H04W 88/085* (2013.01)
USPC ........................................................ 370/328

(58) Field of Classification Search
USPC ........................................................ 370/328
See application file for complete search history.

(56) References Cited

U.S. PATENT DOCUMENTS 6,985,459 B2 * 1/2006 Dickson ........................ 370/328
7,099,285 B1 * 8/2006 Kanuri et al. ................. 370/254
7,460,513 B2 * 12/2008 Osterling ...................... 370/342
(Continued)

FOREIGN PATENT DOCUMENTS

JP  2008-516503      5/2008
JP  2009-171373      7/2009
JP  2009-284066      12/2009
WO  WO 2006040653 A1 * 4/2006 ............... H04Q 7/30

OTHER PUBLICATIONS

Altera CPRI MegaCore Function User Guide, Dec. 2013, Figure 1-1.*

(Continued)

*Primary Examiner* — Timothy J Weidner
*Assistant Examiner* — Jana Blust
(74) *Attorney, Agent, or Firm* — Drinker Biddle & Reath LLP

(57) ABSTRACT

A useful technique for configuring radio equipment as networking radio equipment is provided. Networking radio equipment 3A connected to a first node via a first link and to a second node via a second link includes a first frame processing unit 31a, a second frame processing unit 31b, and a controller 33. The first frame processing unit 31a performs framing/deframing of a layer 1 frame flowing over the first link, and includes a first port that allows input/output of a layer 2 frame. The second frame processing unit 31b performs framing/deframing of a layer 1 frame flowing over the second link, and includes a second port that allows input/output of a layer 2 frame. The controller 33 controls the radio equipment 3A, and includes a control port that allows input/output of a layer 2 frame. A layer 2 switch 35 determines destination of the layer 2 frame.

12 Claims, 13 Drawing Sheets

(56) References Cited

U.S. PATENT DOCUMENTS

| | | | |
|---|---|---|---|
| 7,525,943 B2* | 4/2009 | Iyer et al. | 370/338 |
| 8,594,731 B2* | 11/2013 | Sakama | 455/561 |
| 2009/0290537 A1* | 11/2009 | Berglund et al. | 370/328 |
| 2014/0094157 A1* | 4/2014 | Nguyen et al. | 455/418 |

OTHER PUBLICATIONS

Common Public Radio Interface (CPRI); Interface Specification, "CPRI Specification V4.1", [online] Feb. 18, 2009, http://www.cpri.info/downloads/CPRI_v_4_12009-02-18.pdf., pp. 1-109.

* cited by examiner

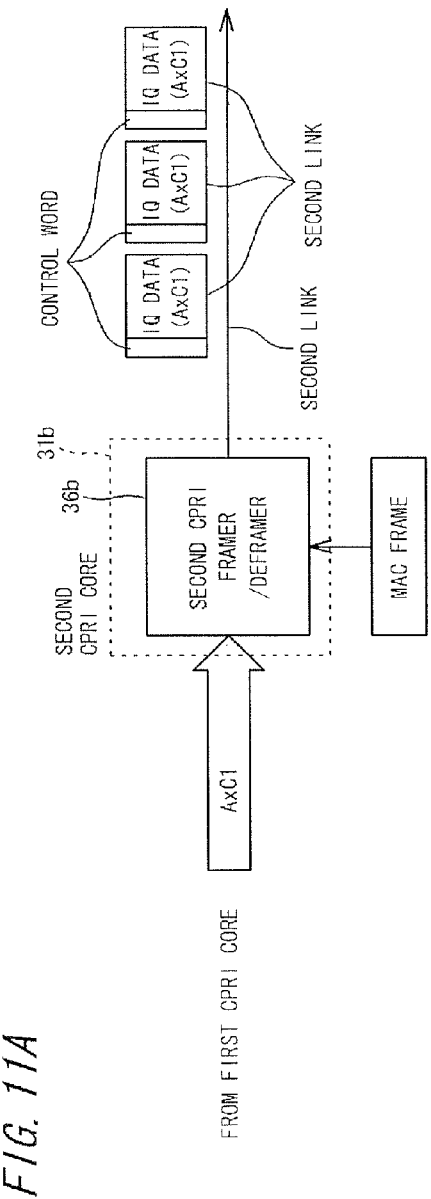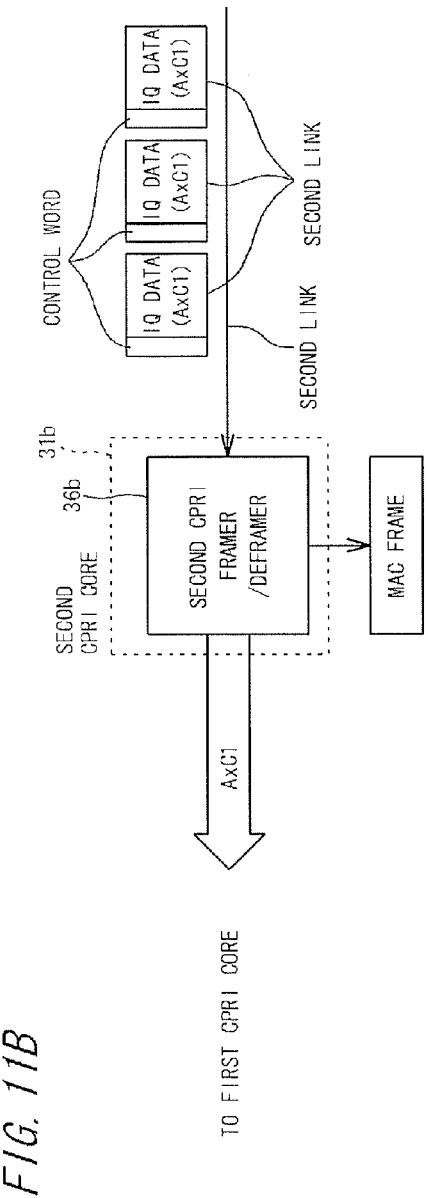

RADIO EQUIPMENT AND RADIO BASE STATION

TECHNICAL FIELD

The present invention relates to radio equipment and radio base stations.

BACKGROUND ART

A radio base station forms an area (cell) in which user terminals such as mobile phones are allowed to wirelessly communicate with the base station.

A radio base station is configured to have a radio equipment control (REC) that performs baseband signal processing in a digital domain, control/management, and the like, and radio equipment (RE) that performs radio signal processing (modulation, amplification, and the like) in an analog domain.

There is a radio base station in which a remote radio head (RRH) having RE is located in a position distant from a base station main body having an REC. In this case, the REC and the RE are connected by an optical fiber, for example.

Common Public Radio Interface (CPRI) has been known as an interface for communication between the REC and the RE (refer to Non-Patent Literature 1). The CPRI defines a CPRI link that connects the REC to the RE. Further, the CPRI supports a layer 1 (physical layer) and a layer 2 (data link layer).

In the CPRI, as a layer 1 frame for communication between the REC and the RE, a frame defined as a basic frame is adopted.

The basic frame adopted in the CPRI consists of 16 words (1 word consists of 8 bits, for example).

The basic frame includes one control word at the beginning, and an IQ data block consisting of 15 words, which follows the control word. Note that IQ (Inphase/Quadrature) data is user data. That is, the user data is transmitted by a radio signal from a radio base station to user equipment, or from the user equipment to the radio base station.

In the CPRI, one "hyperframe" consists of 256 basic frames. One "CPRI 10 ms frame" consists of 150 hyperframes.

The CPRI uses two types of control and management (C&M) channels, a slow C&M channel and a fast C&M channel, as control channels between the REC and the RE. A part of the 256 control words included in one hyperframe constitutes the slow C&M channel, while another part of the 256 control words constitutes the fast C&M channel.

The CPRI supports, as the layer 2, ETHERNET® network technology, High-level Data Link Control (HDLC) procedure, and the like.

In the CPRI, the layer 2 (data link layer) frame structure for the slow C&M channel is based on the HDLC, and the layer 2 frame structure for the fast C&M channel is based on the ETHERNET® network technology.

CITATION LIST

Non Patent Literature

Non-Patent Literature 1: Common Public Radio Interface, "CPRI Specification V4.1", [online], Feb. 18, 2009.

SUMMARY OF THE INVENTION

Problems to be Solved by the Invention

Non-Patent Literature 1 discloses not only a concept of a single hop in which one REC and one RE are connected, but also a concept of a "multi hop" in which a plurality of REs are cascade-connected to one REC.

Non-Patent Literature 1 merely discloses the concept of the multi hop, but does not disclose a method of realizing the multi hop.

An object of the present invention is to provide new technological means that is useful for configuring radio equipment as networking radio equipment.

Solution to the Problems (1) The present invention relates to a radio equipment which is connected, via a first link, to a first node comprising another radio equipment or a radio equipment controller, and is connected, via a second link, to a second node comprising another radio equipment or a radio equipment controller, which are different from those of the first node. The radio equipment comprises: a first frame processing unit that performs framing and deframing of a layer 1 frame flowing over the first link, and includes a first port that allows input and output of a higher layer frame; a second frame processing unit that performs framing and deframing of a layer 1 frame flowing over the second link, and includes a second port that allows input and output of a higher layer frame; and a controller that controls the radio equipment, and includes a control port that allows input and output of a higher layer frame. The first frame processing unit is configured to receive the layer 1 frame including control words via the first link, generate a higher layer frame from the control words included in the layer 1 frame, and output the higher layer frame from the first port to the second port and/or the control port. The second frame processing unit is configured to receive the layer 1 frame including control words via the second link, generate a higher layer frame from the control words included in the layer 1 frame, and output the higher layer frame from the second port to the first port and/or the control port. The controller is configured to output a higher layer frame generated by the controller, from the control port to the first port and/or the second port.

According to the present invention, the first frame processing unit can transform the control words included in the layer 1 frame received from the first node (e.g., the radio equipment controller) via the first link into the form of the higher layer frame, and give the higher layer frame to the second frame processing unit and/or the controller.

When the second frame processing unit receives the higher layer frame from the first frame processing unit and/or the controller, the second frame processing unit can use the higher layer frame for framing of the layer 1 frame, and transfer the layer 1 frame to the second node (e.g., another radio equipment). Further, when the controller receives the higher layer frame, the controller can perform control in accordance with information included in the higher layer.

Conversely, the second frame processing unit can transform the control words included in the layer 1 frame received from the second node (e.g., the radio equipment) via the second link into the form of the higher layer frame, and give the higher layer frame to the first frame processing unit and/or the controller.

When the first frame processing unit receives the higher layer frame from the second frame processing unit and/or the controller, the first frame processing unit can use the higher layer frame for framing of the layer 1 frame, and transmit the layer 1 frame to the first node (e.g., the radio equipment controller).

(2) The radio equipment further includes a switch connected to the first port, the second port, and the control port.

When switch receives the higher layer frame outputted from any of the first port, the second port, and the control port, the switch can determine, based on a destination address included in the higher layer frame, to which of the first port, the second port, and the control port the higher layer frame is to be given.

In this case, the higher layer frame whose destination is another radio equipment can be easily given to the second frame processing unit via the switch.

(3) Preferably, the controller is configured to generate and output a higher layer frame having an address of another radio equipment as a destination address. In this case, the radio equipment and the another radio equipment are allowed to exchange information.

(4) Preferably, the switch determines, based on a destination MAC address included in the higher layer frame, to which of the first port, the second port, and the control port the higher layer frame is to be given.

(5) The switch may determine, based on a destination IP address included in the higher layer frame, to which of the first port, the second port, and the control port the higher layer frame is to be given.

(6) Preferably, each of the first port and the second port consists of a single port. In this case, the configuration of the frame processing unit is simplified.

(7) Preferably, the first frame processing unit includes a first user data port that allows the first frame processing unit to exchange user data transmitted by a radio signal, with a radio signal unit that performs transmission/reception of a radio signal, and with the second frame processing unit, and the second frame processing unit includes a second user data port that allows the second frame processing unit to exchange user data with the first frame processing unit. In this case, transfer of the user data between the first frame processing unit and the second frame processing unit can be performed through a path different from that for the higher layer frame.

(8) Preferably, each of the first link and the second link is a CPRI (Common Public Radio Interface) link.

(9) Preferably, the layer 1 frame is a layer 1 frame in the CPRI.

(10) Preferably, the higher layer frame is a layer 2 frame.

(11) Preferably, the higher layer frame is a layer 2 frame for a fast C&M channel in the CPRI.

(12) Another aspect of the present invention relates to a radio base station in which a plurality of radio equipment are cascade connected to a radio equipment controller, and the radio equipment according to any one of the above (1) to (11) is used as each of the plurality of radio equipment.

Advantageous Effects of the Invention

According to the present invention, it is possible to obtain technological means that is useful for configuring radio equipment as networking radio equipment.

BRIEF DESCRIPTION OF THE DRAWINGS

FIG. 11 is a diagram illustrating a second framer/deframer process.

DESCRIPTION OF EMBODIMENTS

Hereinafter, a preferred embodiment of the present invention will be described with reference to the drawings.

[1. Overall Configuration of Radio Base Station]

Figure 1:
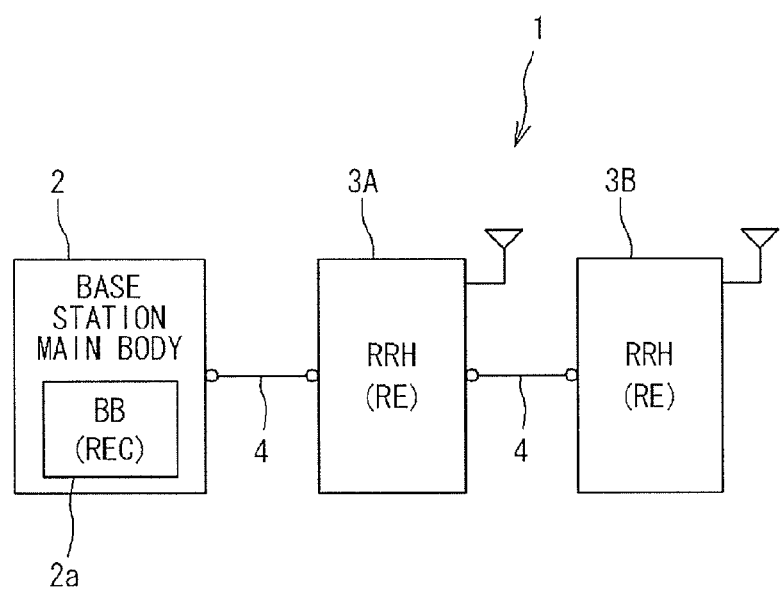
FIG. 1 is a schematic diagram illustrating a radio base station.

FIG. 1 illustrates a radio base station 1. In the radio base station 1, a plurality of remote radio heads (REs) 3A and 3B are cascade-connected to a base station main body 2 having a baseband processing unit (REC) 2a. The base station main body 2 and the remote radio head (RRH) 3A are connected to each other by an optical fiber 4, and the two RRHs 3A and 3B are connected to each other by an optical fiber 4.

Figure 2:
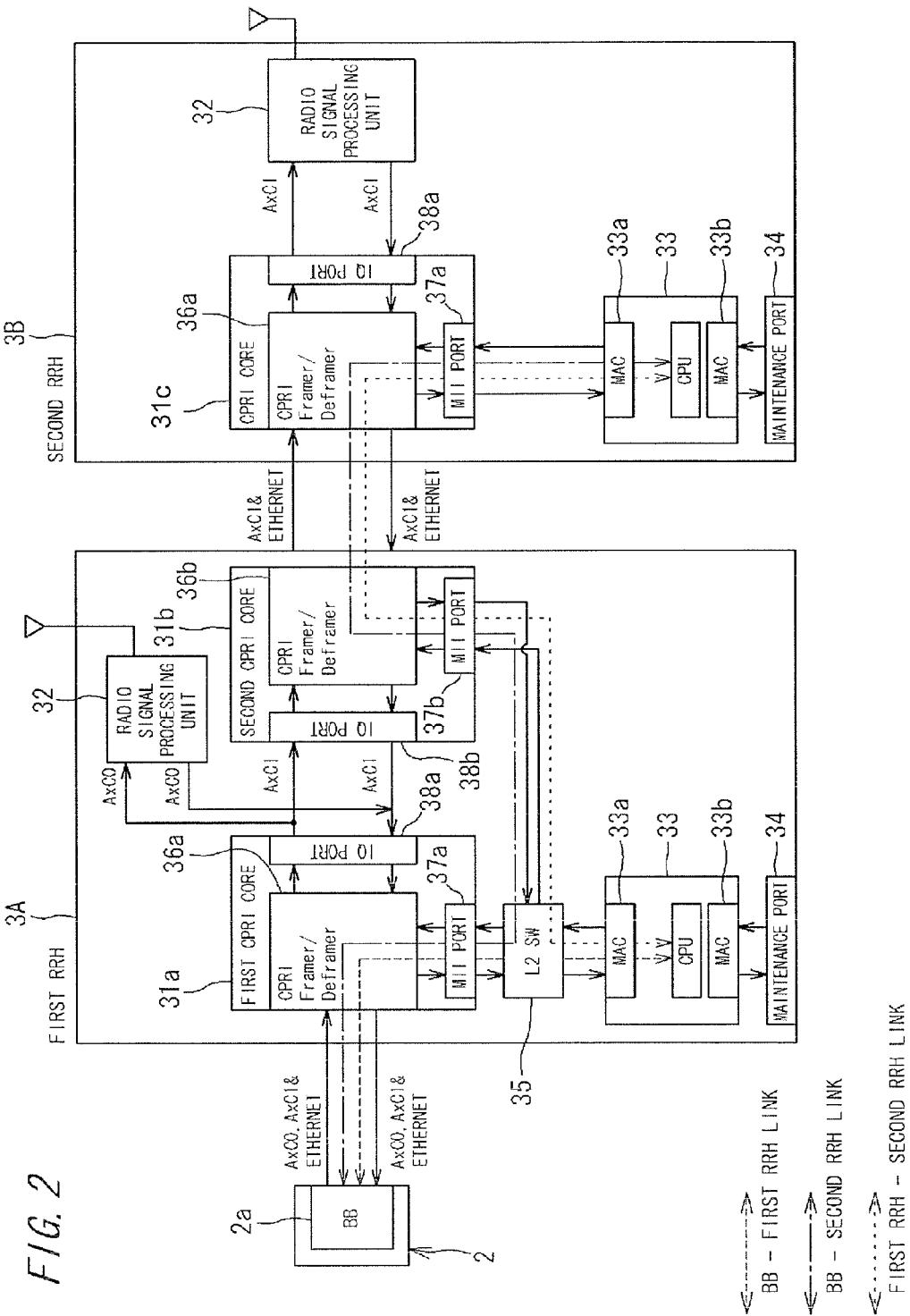
FIG. 2 is a block diagram illustrating the radio base station in detail.

FIG. 2 illustrates the configuration of the radio base station 1 shown in FIG. 1 in detail. The baseband processing unit 2a that functions as an REC performs baseband signal processing in a digital domain, and controls the RRHs 3A and 3B as REs.

In the present embodiment, an interface between the baseband processing unit 2a of the base station main body 2 and the RRH 3A, and an interface between the two RRHs 3A and 3B are based on Common Public Radio Interface (CPRI). However, the present invention is not limited to the CPRI. For the CPRI, refer to [2. CPRI] described later.

Of the RRHs 3A and 3B functioning as REs, the intermediate first RRH 3A, which is located between the base station main body 2 and the second RRH 3B located at an end of the cascade connection, functions as networking radio equipment (RE).

Hereinafter, the base station main body (REC) and the RRHs (REs) are collectively referred to as "nodes", and a bidirectional interface between directly connected two nodes is referred to as a "link".

The networking RE 3A is connected to a first node (the baseband processing unit 2a of the base station main body 2 in FIG. 1) via a first link (first CPRI optical link), and to a second node (the RRH 3B in FIG. 1) via a second link (second CPRI optical link). The first node may be another RRH. The second node may be the baseband processing unit 2a of the base station main body 2. A plurality of networking REs may be present in one base station 1.

The networking RE 3A performs, for itself (3A), data transmission with the base station main body 2. In addition, the networking RE 3A transmits data (downlink data) from the base station main body 2 to the RRH 3B, and transmits data (uplink data) from the RRH 3B to the base station main body 2.

As shown in FIG. 2, the networking RE 3A includes a plurality of (two) CPRI cores (frame processing units) 31a and 31b, a radio signal processing unit (radio signal unit) 32, a controller 33, a maintenance port 34, and a switch (layer 2 switch) 35.

The plurality of CPRI cores 31a and 31b include CPRI framer/deframers 36a and 36b, respectively. Each of the framer/deframers 36a and 36b performs framing and deframing of a frame (layer 1 frame) that flows over a link.

The first CPRI core (first frame processing unit) 31a is connected to the baseband processing unit 2a of the base station main body 2, and forms a first CPRI link between itself and the base station main body 2.

The second CPRI core (second frame processing unit) 31b is connected to a CPRI core 31c of the other RRH 3B, and forms a second CPRI link between itself and the RRH 3B.

The CPRI cores 31a and 31b each include a single media independent interface (MII) port 37a or 37b that allows input/output of an ETHERNET® network frame (fast C&M data).

Further, the CPRI cores 31a and 31b each include a single IQ port (user data port) 38a or 38b that allows input/output of IQ data (user data).

The MII ports 37a and 37b of the CPRI cores 31a and 31b are respectively connected to the switch 35. The IQ port 38a of the first CPRI core 31a is connected to the radio signal processing unit 32 that performs analog signal processing such as modulation and demodulation of a radio signal, and to the IQ port 38b of the second CPRI core 31b.

The controller 33 controls the entirety of the RRH 3A, and includes a CPU. The controller 33 is connected to the switch 35 via a first control port (MAC port) 33a. That is, the controller 33 is connected to the MII port (first port) 37a of the first CPRI core 31a and to the MII port (second port) 37b of the second CPRI core 31b (via the switch 35).

Further, the controller 33 has a second control port (MAC port) 33b. The second control port 33b is connected to the maintenance port (PHY port) 34 of the RRH 3A. An external terminal device such as a PC can be connected to the maintenance port (external port) 34.

The base station main body 2 also includes a controller (not shown) for controlling the base station main body 2.

In the present embodiment, the switch 35 is configured as a layer 2 switch. The layer 2 switch determines the destination of a layer 2 frame with reference to the frame, and transfers the frame. More specifically, the switch 35 determines the destination of the ETHERNET® network MAC frame as the layer 2 frame, based on a destination MAC address included in the ETHERNET® network MAC frame.

The switch 35 of the present embodiment receives the layer 2 frame (ETHERNET® network MAC frame) from the MII port 37a of the first CPRI core 31a, the MII port 37b of the second CPRI core 31b, or the first control port 33a of the controller 33, and determines to which of the MII ports 37a and 37b and the first control port 33a the layer 2 frame is to be transferred.

In the radio base station 1, the RRH 3B that is connected at an end of the cascade connection is identical in configuration to the RRH 3A, except that the second CPRI core 31b and the switch 35 included in the RRH 3A are omitted. The RRH 3B may have the same configuration as the RRH 3A.

[2. CPRI]

Figure 3:
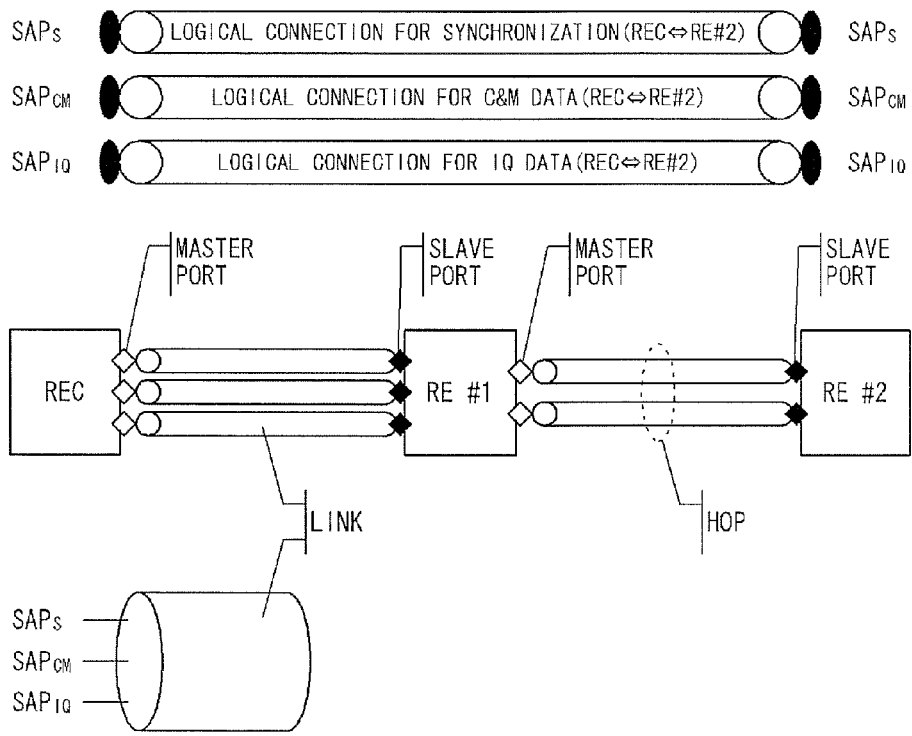
FIG. 3 is a diagram illustrating defined CPRI terms.

The CPRI defines an interface between an REC and RE in a radio base station. As shown in FIG. 3, three types of data, i.e., user plane data, control and management (C&M) plane data, and synchronization plane data, are time-division multiplexed onto the link between the REC and the RE, and the link between the two REs.

The user plane data is data (IQ data) to be transmitted from a base station to a user terminal (mobile terminal), and from the user terminal to the base station. The C&M plane data (control information) is control data for call processing, and management data for operation, administration, and maintenance of the CPRI links and nodes. The C&M plane data is exchanged between the controllers 33 included in the nodes 2, 3A, and 3B. The synchronization plane data is synchronization and timing information to be exchanged between the nodes.

The CPRI supports the layer 1 (physical layer) and the layer 2 (data link layer). The CPRI defines a basic frame structure as a frame structure of the layer 1.

Figures 4A, 4B:
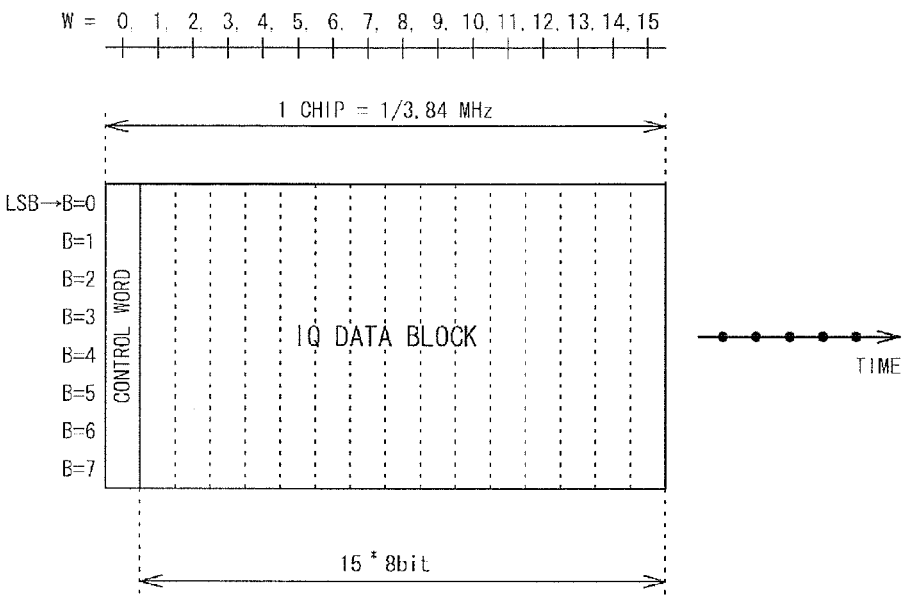
FIG. 4 is a diagram illustrating a basic frame structure.

As shown in FIG. 4A, a basic frame consists of 16 words. The words constituting the basic frame have indices W=0 . . . 15. The basic frame shown in FIG. 4A has a length of 1/3.84 MHz=about 260.42 ns. The length T of one word is 8 bits (1 byte) in FIG. 4. In FIG. 4A, the bits constituting one word have indices B=0 . . . 7.

The CPRI also defines, as the length T of one word, 16 bits, 32 bits, 40 bits, 64 bits, 80 bits, and the like.

In the basic frame, the word at the beginning, whose index W is 0, is a control word. The control word is an element for constituting a subchannel in the CPRI, and it can be an element for constituting a MAC frame described later.

The remaining words (W=1 . . . 15) of the basic frame are dedicated to the user data (IQ data), and are referred to as an IQ data block. The user data (IQ data block) is divided into units of "AxC containers" to be treated. As shown in FIG. 4B, in the present embodiment, two words whose indices W are 1 and 2 are regarded as one "AxC container" which is referred to as "AxC0". Further, two words whose indices W are 3 and 4 are regarded as another "AxC Container" which is referred to as "AxC1".

Figure 5:
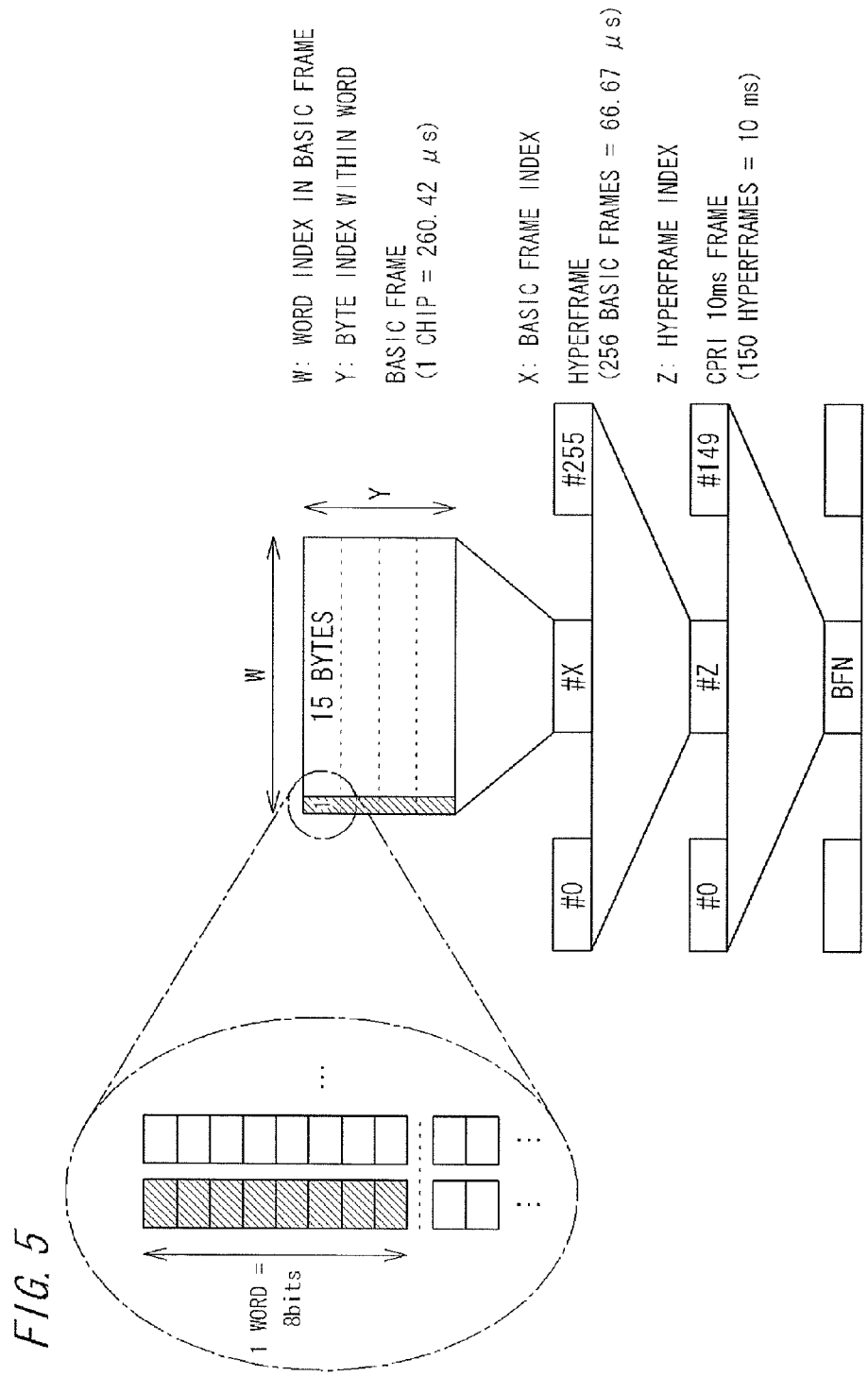
FIG. 5 is a diagram illustrating a CPRI frame hierarchy.

In the CPRI, as shown in FIG. 5, one hyperframe consists of 256 basic frames. In FIG. 5, X indicates one of indices (X=0 . . . 255) of the basic frames in one hyperframe.

One CPRI 10 ms frame consists of 150 hyperframes. In FIG. 5, Z indicates one of indices (Z=0 . . . 149) of the hyperframes in one CPRI 10 ms frame.

Figure 6:
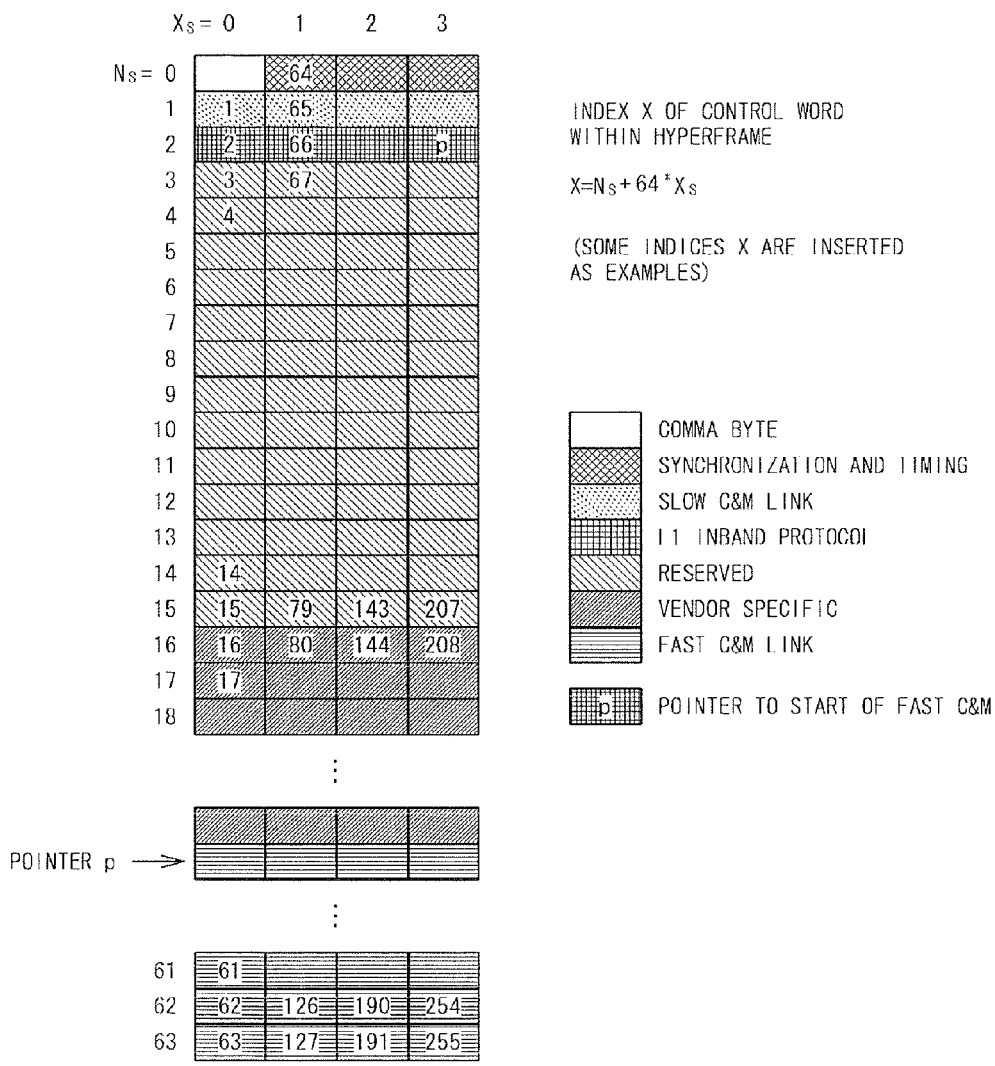
FIG. 6 is a diagram illustrating subchannels within a CPRI hyperframe.

One hyperframe consisting of 256 basic frames has 256 control words. As shown in FIG. 6, the 256 control words foam 64 subchannels. In one hyperframe, 1 subchannel has 4 control words.

Figure 7:
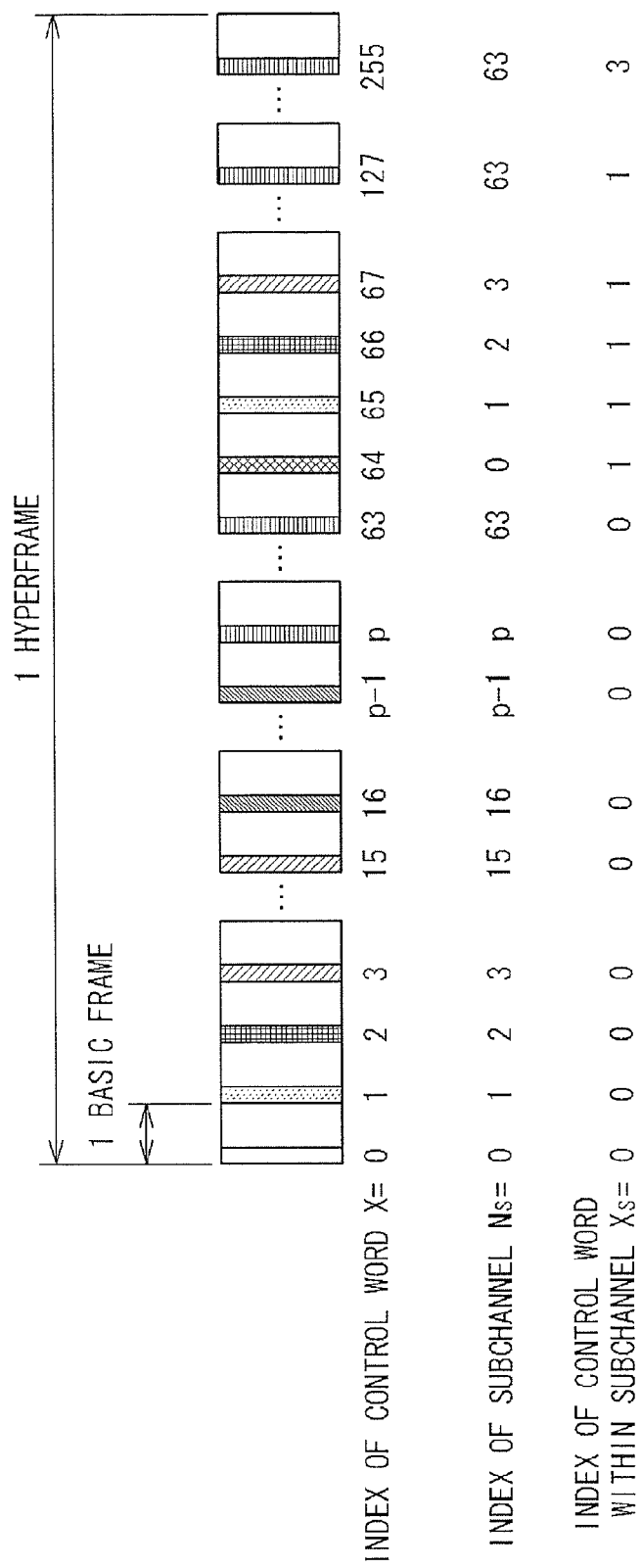
FIG. 7 is a diagram illustrating subchannels within a CPRI hyperframe.

In FIGS. 6 and 7, Ns indicates one of indices (Ns=0 . . . 63) of the subchannels, and Xs indicates one of indices (Xs=0, 1, 2, 3) of the control words in one subchannel. Each of the indices X of the control words in one hyperframe is given by X=Ns+64×Xs.

In FIG. 6, a control word corresponding to [Ns,Xs]=[0,0] is a comma byte. Three control words corresponding to [Ns,Xs]=[0,1], [0,2], [0,3] form synchronization and timing information. Four control words corresponding to [Ns,Xs]=[1,0], [1,1], [1,2], [1,3] form a slow C&M link.

Four control words corresponding to [Ns,Xs]=[2,0], [2,1], [2,2], [2,3] form an L1 inband protocol. Of the control words forming the L1 inband protocol, a control word corresponding to [Ns,Xs]=[2,3] serves as a pointer (pointer to start of fast C&M) p that points a subchannel Ns to be a start position of the fast C&M in the hyperframe.

Subchannels whose indices Ns are 3 to 15 are auxiliary subchannels. Subchannels from a subchannel whose index Ns is 16 up to the subchannel pointed by the pointer p are vendor specific subchannels. Subchannels from the subchannel pointed by the pointer p up to a subchannel whose index Ns is 63 are fast C&M link subchannels.

As described above, the CPRI supports two types of C&M channels, a slow C&M channel and a fast C&M channel. The slow C&M channel is based on the HDLC, and the fast C&M channel is based on the ETHERNET® network technology.

Figure 8:
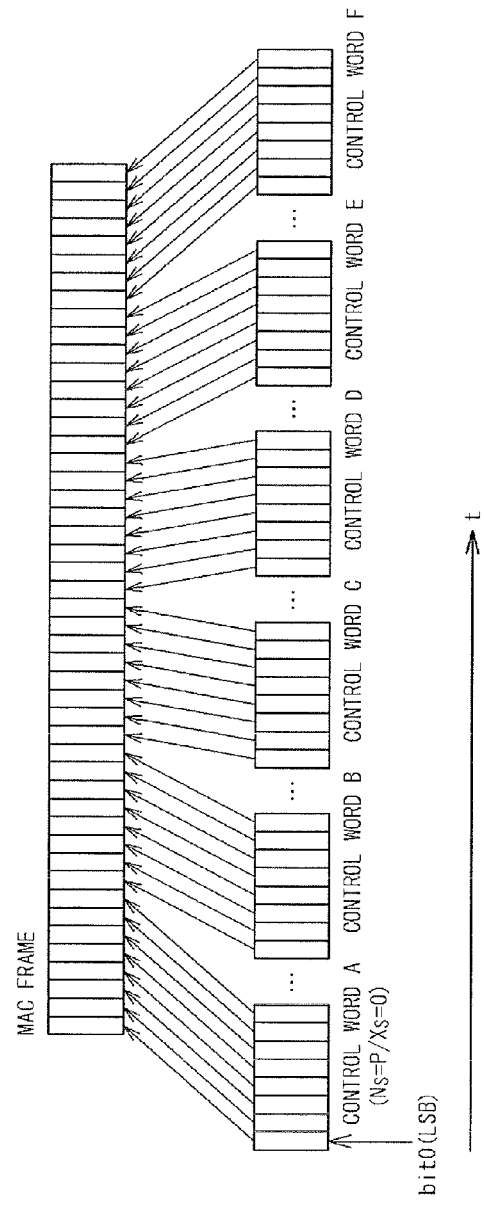
FIG. 8 is a diagram illustrating mapping from control words to ETHERNET® network frames.

FIG. 8 illustrates mapping between control words A, B, C, D, E, F . . . constituting the fast C&M channel, and the MAC frame (layer 2 frame) based on the ETHERNET® network technology. The bits of the control words A, B, C, D, E, F . . . constituting the fast C&M channel shown in FIG. 8A are successively mapped to the bits of the MAC frame, starting from the LSB of each control word, as shown in FIG. 8B. That is, one MAC frame is formed by combining a plurality of control words.

Figure 9:
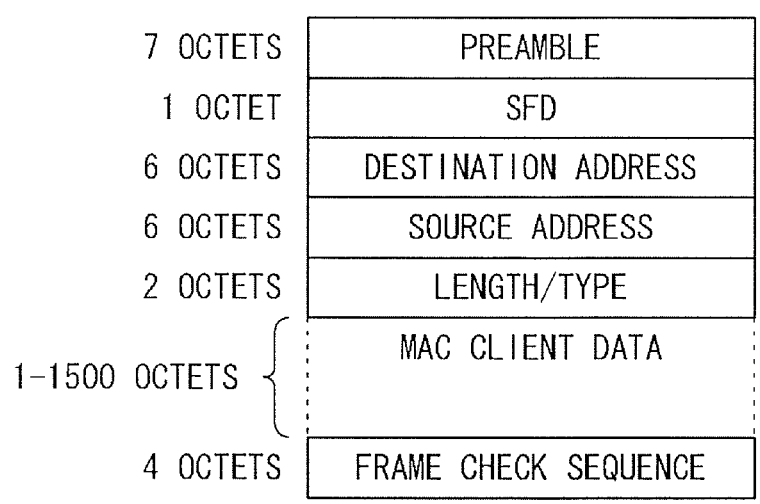
FIG. 9 is a diagram illustrating a MAC frame structure.

The frame structure of the MAC frame as the layer 2 frame is based on the section entitled "Media Access Control Frame Structure" in IEEE 802.3-2005. The structure of the MAC frame is illustrated in FIG. 9. The MAC frame shown in FIG. 9 includes preamble, start frame delimitor (SFD), destination address, source address, length/type, MAC client data, and frame check sequence.

In a destination address area in the MAC frame, a MAC address of a node that is a destination of the control information (C&M data), i.e., a MAC address of any of the base station main body 2, the first RRH 3A, and the second RRH 3B, is stored. Further, in a source address area in the MAC frame, a MAC address of a node that is a source of the control information, i.e., a MAC address of any of the base station main body 2, the first RRH 3A, and the second RRH 3B, is stored.

The control information is stored in the MAC client data area.

[3. Framer/Deframer in CPRI Core]

As shown in FIG. 2, the RRH 3A of the present embodiment includes two CPRI cores (frame processing units) 31*a* and 31*b* having framer/deframers 36*a* and 36*b*, respectively. The CPRI cores 31*a* and 31*b* perform processing relating to the layer 1 in the CPRI.

Figures 10A, 10B:
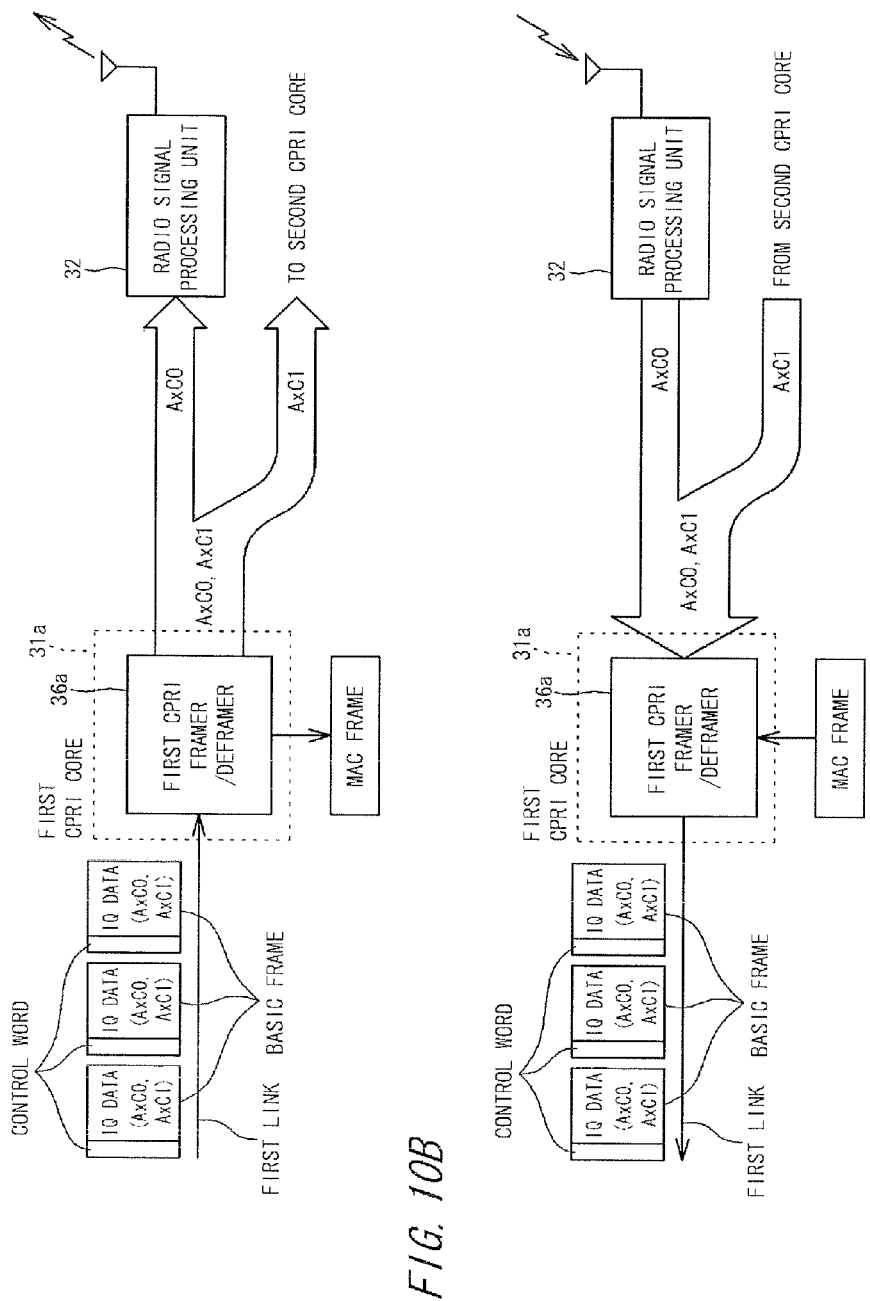
FIG. 10 is a diagram illustrating a first framer/deframer process.

As shown in FIG. 10A, the first framer/deframer 36*a* of the first CPRI core 31*a* can receive basic frames from the baseband processing unit 2*a* via the first link. The first framer/deframer 36*a* maps, to the MAC frame, the bits of the control words constituting the fast C&M channel among the control words included in the received plurality of basic frames (refer to FIG. 8). In other words, the MAC frame that is a frame of a layer (layer 2) higher than the layer 1 is formed from the basic frames as the layer 1 frame.

The generated MAC frame is outputted from the MII port 37*a* to the switch 35.

Further, the first framer/deframer 36*a* outputs, from the first IQ port 38*a*, an IQ data block (W=1 to 15, B=0 to 7) obtained by eliminating the control word from each basic frame.

In the present embodiment, of all the words (W=1 to 15) constituting the IQ data block of the basic frame transmitted from the baseband processing unit 2*a*, AxC0 (W=1, 2; refer to FIG. 4B) is allocated to the RRH 3A, and AxC1 (W=2, 3; refer to FIG. 4B) is allocated to the RRH 3B. The remaining words (W=5 to 15) are non-allocated (null) words.

However, allocation of the "AxC containers" to the RRHs 3A and 3B is not limited to that described above, but a plurality of "AxC containers" may be allocated to one RRH. Allocation to a plurality of RRHs may be performed in units of "AxC containers", or in units of words into which the IQ data block is divided.

A bus extended from the first IQ port 38*a* diverges such that, of the IQ data (W=1 to 15) outputted from the first IQ port 38*a*, the AxC0 (W=1, 2) that is a part of the IQ data is given to the radio signal processing unit 32, and the AxC1 (W=3, 4) is given to the second IQ port 38*b* of the second CPRI core 31*b*.

The IQ data (IQ data of the AxC0) received from the first framer/deframer 36*a* by the radio signal processing unit 32 is radio transmission data to the user terminal. A process relating to the IQ data (AxC1) given to the second CPRI core 31*b* will be described later.

As shown in FIG. 10B, the first framer/deframer 36*a* can receive, at the first IQ port 38*a*, the IQ data (AxC0, AxC1) transmitted from the radio signal processing unit 32 and/or the second CPRI core 31*b*. The IQ data (AxC0, AxC1) received by the first framer/deframer 36*a* are combined to form the IQ data block. When the IQ data block is formed, if the formed IQ data block includes the words (W=5 to 15) that are allocated to none of the RRHs, nulls are set for the words.

Then, a control word is added at the beginning of the IQ data block, thereby forming a basic frame.

The first framer/deframer 36*a* obtains the control words for forming the basic frames (layer 1 frame) by, for example, deframing the MAC frame (higher layer frame) received at the MII port 37*a*. Specifically, the control words are obtained by subjecting the MAC frame to a process reverse to the mapping shown in FIG. 8 (reverse mapping).

The first framer/deframer 36*a* can obtain other information to be control words from the controller 33 or another device in the first RRH 3A. The other information to be control words may be obtained from a port (not shown) in the first framer/deframer 36*a*.

The first framer/deframer 36*a* transmits the basic frames obtained as described above to the baseband processing unit 2*a* via the first link.

As shown in FIG. 11A, the second framer/deframer (second frame processing unit) 36*b* in the second CPRI core 31*b* can receive the IQ data (AxC1) for the RRH 3B, from the first CPRI core 31*a* via the bus connecting the first and second framer/deframers (refer to FIG. 10A). The second framer/deframer 36*b* adds necessary nulls to the IQ data (AxC1) received at the IQ port 38*b*, thereby forming an IQ data block in which IQ data are stored only in the AxC1. Then, a control word is added at the beginning of the IQ data block, thereby forming a basic frame.

The second framer/deframer 36*b* obtains control words for forming basic frames by performing, for example, reverse mapping of the MAC frame received at the MII port 37*b*.

The second framer/deframer 36*b* can obtain other information to be control words from the controller 33 or another device in the first RRH 3A. The other information to be control words may be obtained from a port (not shown) in the second framer/deframer 36*b*.

The second framer/deframer 36*b* transmits the basic frames obtained as described above to the RRH 3B via the second link.

Further, as shown in FIG. 11B, the second framer/deframer 36*b* can receive the basic frames transmitted from the framer/deframer 31*a* of the RRH 3B, via the second link. The second framer/deframer 36*b* maps, to the MAC frame, the bits of the control words constituting the fast C&M channel among the control words included in the received plurality of basic frames (refer to FIG. 8). In other words, the MAC frame that is a frame of a layer (layer 2) higher than the layer 1 is formed from the basic frames as the layer 1 frame.

The generated MAC frame is outputted from the MII port 37*b* to the switch 35.

Further, the second framer/deframer 36*a* outputs the AxC1 in the IQ data block obtained by eliminating the control words from the basic frames, from the IQ port 38*b* to the first CPRI core 31*a* (refer to FIG. 10B).

[4. Switch]

The first CPRI core 31*a*, the second CPRI core 31*b*, and the controller 33, each of which outputs a MAC frame including control information, are allowed to transmit the MAC frame to any of these components 31*a*, 31*b*, 33 but itself.

Destination of the MAC frame is determined by the switch 35 as a layer 2 switch.

Figure 12:
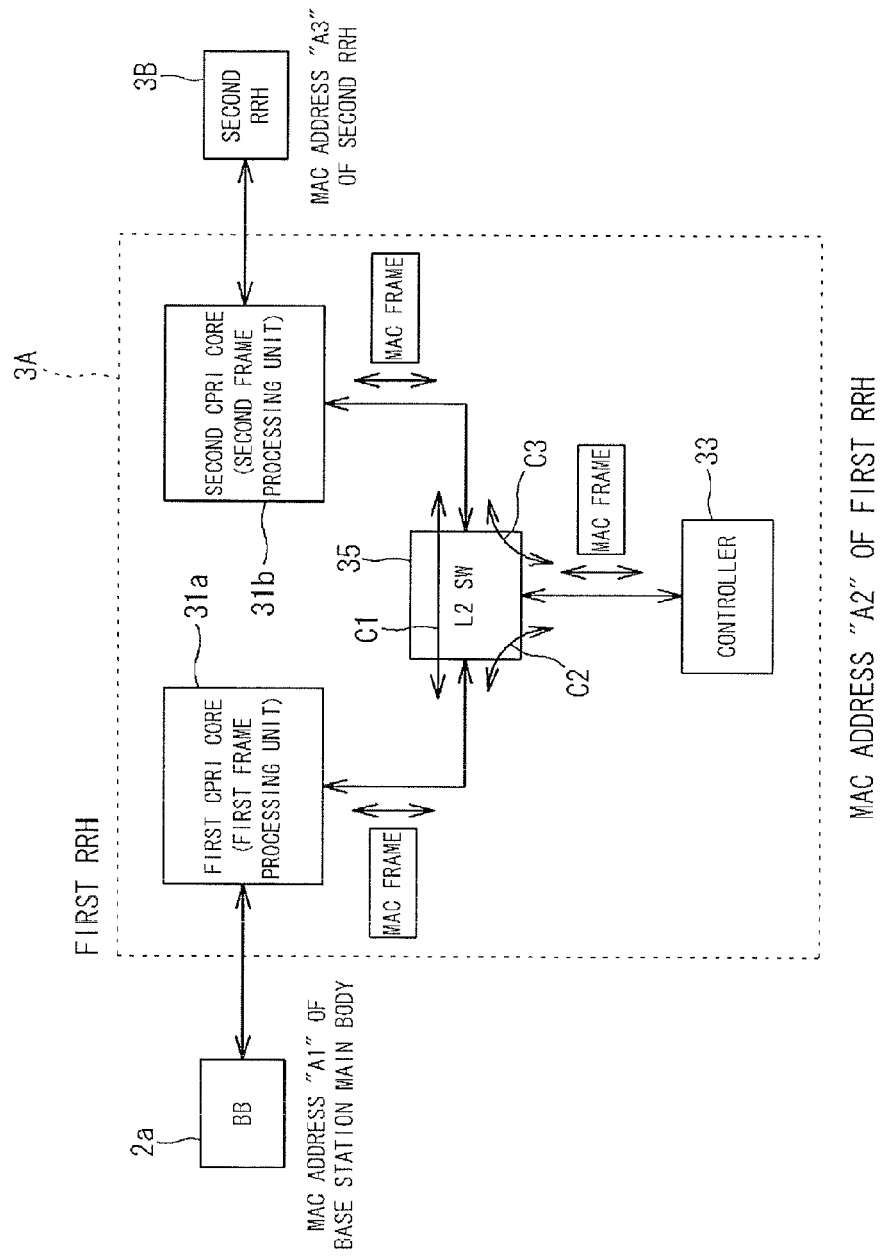
FIG. 12 is a diagram illustrating determination of frame destination by a switch.

Specifically, the switch 35 can perform switching so that the MAC frame flows between the first CPRI core 31a and the second CPRI core 31b (refer to C1 in FIG. 12). Such switching is performed when the MAC address "A1" of the base station main body and the MAC address "A3" of the second RRH 3B are set as a destination address and a source address of the MAC frame, respectively.

Further, as shown by C2 in FIG. 12, the switch 35 can perform switching so that the MAC frame flows between the first CPRI core 31a and the controller 33. Such switching is performed when the MAC address "A1" of the base station main body and the MAC address "A2" of the first RRH 3A are set as a destination address and a source address of the MAC frame, respectively.

Further, as shown by C3 in FIG. 12, the switch 35 can perform switching so that the MAC frame flows between the controller 33 and the second CPRI core 31b. Such switching is performed when the MAC address "A2" of the first RRH 3A and the MAC address "A3" of the second RRH 3B are set as a destination address and a source address of the MAC frame, respectively.

Of the flows C1, C2, and C3 of the MAC frame including the control information as shown in FIG. 12, the flow C1 enables formation of a control link (maintenance and monitoring link) between the baseband processing unit 2a and the controller 33 of the second RRH 3B as shown in FIG. 2.

That is, when the fast C&M data to be given from the baseband processing unit 2a to the second RRH 3B is received by the first RRH 3A, the data is transferred to the second RRH 3B via the first CPRI core 31a, the switch 35, and the second CPRI core 31b in the first RRH 3A.

Further, when the fast C&M data to be given from the second RRH to the baseband processing unit 2a is received by the first RRH 3A, the data is transferred to the baseband processing unit 2a via the second CPRI core 31b, the switch 35, and the first CPRI core 31a in the first RRH 3A.

The flow C2 shown in FIG. 12 enables formation of a control link (maintenance and monitoring link) between the baseband processing unit 2a and the controller 33 of the first RRH 3A as shown in FIG. 2.

That is, when the fast C&M data to be given from the baseband processing unit 2a to the first RRH 3A is received by the first RRH 3A, the data is transferred to the controller 33 of the first RRH 3A via the first CPRI core 31a and the switch 35 in the first RRH 3A.

Further, when the MAC frame including the control information which is to be given from the first RRH 3A to the baseband processing unit 2a is generated by the controller 33 of the first RRH 3A, the control information is transferred to the baseband processing unit 2a via the switch 35 and the first CPRI core 31a.

Moreover, in the present embodiment, since the flow C3 shown in FIG. 12 is possible, it is possible to form a control link between the first RRH 3A and the second RRH 3B (inter-RRH cooperative control link) as shown in FIG. 2.

That is, when the controller 33 of the first RRH 3A outputs the MAC frame including the control information to be given to the second RRH 3B, the control information is transferred to the second RRH 3B via the switch 35 and the second CPRI core 31b.

Further, when the controller 33 of the second RRH 3B outputs the MAC frame including the control information to be given to the first RRH 3A, the control information is transferred to the controller of the first RRH 3A via the CPRI core 31a in the second RRH 3B, and the CPRI core 31b and the switch 35 in the first RRH 3A.

In the CPRI, the control information such as the fast C&M data is exchanged between the REC (baseband processing unit) 2a and the REs (RRHs) 3A and 3B. In the present embodiment, however, the control information can be exchanged between the RRHs. Moreover, since determination of frame destination is performed by the switch 35, the CPRI cores 31a and 31b each need only one MII port 37a or 37b, thereby simplifying the configuration.

In addition to forming the MAC frame whose destination address is the address of the base station main body 2, the controller 33 of the first RRH 3A can form a MAC frame whose destination address is the address of the second RRH 3B in order to transmit control information from the first RRH 3A to the second RRH 3B.

Further, in addition to forming the MAC frame whose destination address is the address of the base station main body 2, the controller 33 of the second RRH 3B can form a MAC frame whose destination address is the address of the first RRH 3A in order to transmit control information from the second RRH 3B to the first RRH 3A.

In the present embodiment, when the multi-hop configuration is adopted, it is possible to form a control link between the RRHs, which enables bidirectional exchange of control information between the RRHs. Therefore, it is possible to perform maintenance and monitoring of the second RRH 3B from an external terminal connected to the maintenance port 34 of the first RRH 3A, and vise versa.

Further, since it is possible to exchange the control information between the RRHs, it is possible to realize cooperative control between the RRHs.

[5. Modifications]

[5.1 Omission of Switch]

Figure 13:
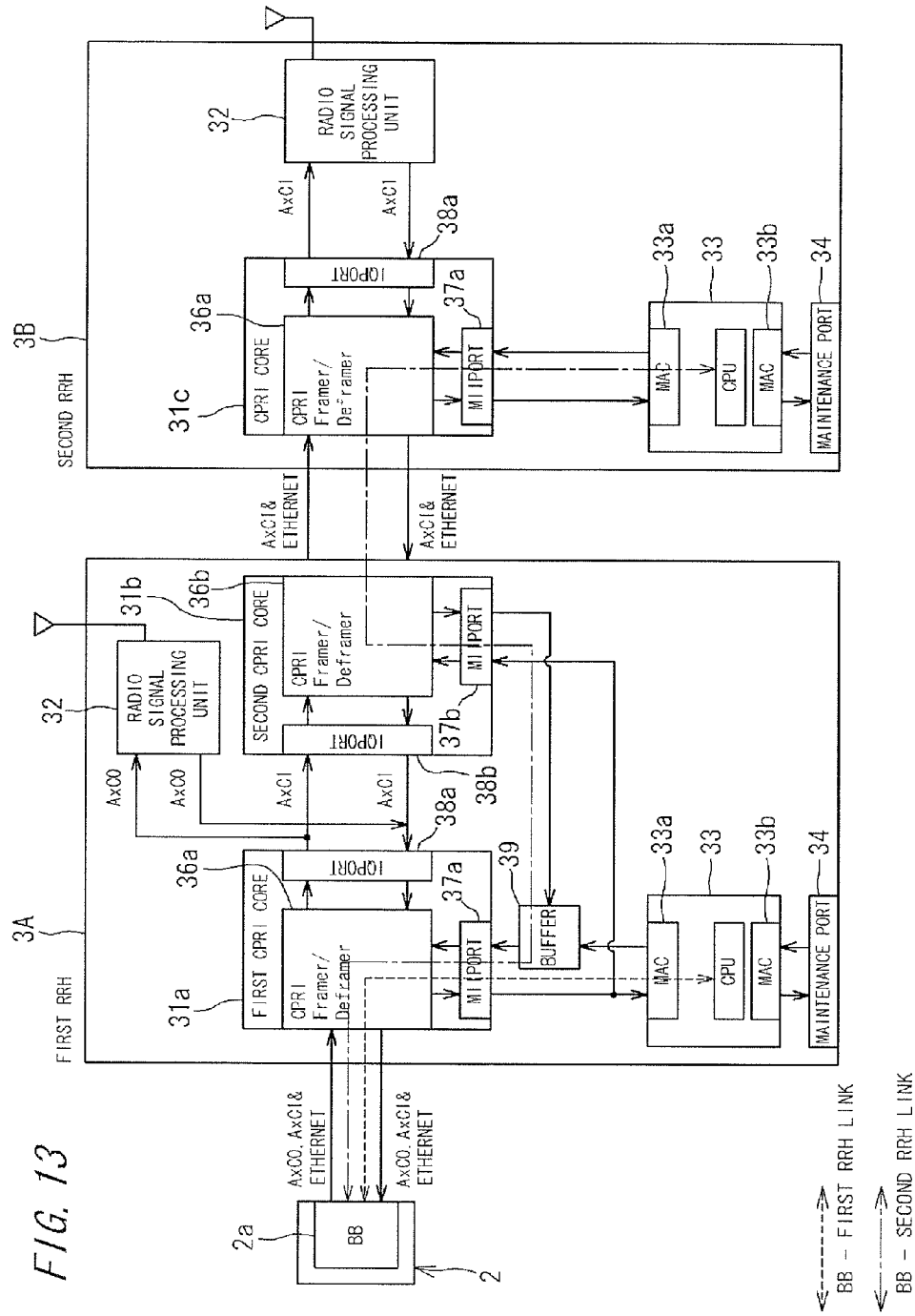
FIG. 13 is a diagram illustrating another example of a radio base station in detail.

FIG. 13 illustrates an example in which the switch 35 shown in FIG. 2 is omitted. In FIG. 13, the output of the MIT port 37a of the first CPRI core 31a is connected to the input of the first control port 33a of the controller 33 and to the input of the MIT port 37b of the second CPRI core 31b.

Further, the output of the first control port 33a of the controller 33 of the first RRH 3A and the output of the MIT port 37b of the second CPRI core 31b are connected to the input of the MII port 37a of the first CPRI core 31a via a buffer (bandwidth controller) 39.

In the case of FIG. 13, the MAC frame outputted from the first CPRI core is given to both the controller 33 and the second CPRI core 31b. The MAC frame outputted from the second CPRI core is given to the first CPRI core 31a. The MAC frame outputted from the controller 33 is also given to the first CPRI core 31a.

In the example of FIG. 13, it is not possible to form a control link between the first RRH 3A and the second RRH 3B as shown in FIG. 2, but it is possible to form a bidirectional control link between the baseband processing unit 2a and the controller 33 of the first RRH 3A, and a bidirectional control link (maintenance and monitoring link) between the baseband processing unit 2a and the controller 33 of the second RRH 3B.

In FIG. 13, the buffer 39 may be omitted. However, the buffer 39 enables appropriate bandwidth limitation. That is, the output of the MII port 37b of the second CPRI core 31b and the output of the control port 33a of the controller 33 join at the input of the MII port 37a of the first CPRI core 31a. Accordingly, the communication band might be exceeded unless the input of the MII port 37b is subjected to bandwidth limitation. However, appropriate bandwidth limitation is realized by providing the buffer 39.

For those points that are not described with respect to the example of FIG. 13, the matters described with respect to the example of FIG. 2 are incorporated.

[5.2 Layer 3 switch]

In the present embodiment, the layer 2 switch is adopted as the switch 35. However, a layer 3 switch may be adopted as the switch 35. Based on a destination IP address included in an ETHERNET® network frame, the layer 3 switch can determine the destination of the frame.

The embodiments disclosed are to be considered in all respects as illustrative and not restrictive. The scope of the invention is indicated by the appended claims rather than by the foregoing meaning, and all changes which come within the meaning and range of equivalency of the claims are therefore intended to be embraced therein.

For example, in the present embodiment, the ETHERNET® network MAC frame exchanged between the first CPRI core 3A, the second CPRI core 3A, and the controller 33 consists of only the information of the fast C&M of the CPRI. However, the ETHERNET® network MAC frame may include other pieces of information (e.g., "L1 inband protocol", "reserved", "vendor specific", etc).

[5.2 Layer 3 Switch]

In the present embodiment, the layer 2 switch is adopted as the switch 35. However, a layer 3 switch may be adopted as the switch 35. Based on a destination IP address included in an Ethernet frame (registered trademark), the layer 3 switch can determine the destination of the frame.

The embodiments disclosed are to be considered in all respects as illustrative and not restrictive. The scope of the invention is indicated by the appended claims rather than by the foregoing meaning, and all changes which come within the meaning and range of equivalency of the claims are therefore intended to be embraced therein.

For example, in the present embodiment, the ETHERNET® network MAC frame exchanged between the first CPRI core 3A, the second CPRI core 3A, and the controller 33 consists of only the information of the fast C&M of the CPRI. However, the ETHERNET® network MAC frame may include other pieces of information (e.g., "L1 inband protocol", "reserved", "vendor specific", etc).

DESCRIPTION OF THE REFERENCE CHARACTERS 1 radio base station
2 base station main body
2a baseband processing unit (radio equipment controller)
3A remote radio head (radio equipment)
3B remote radio head (radio equipment)
31a first CPRI core (first frame processing unit)
31b second CPRI core (second frame processing unit)
33 controller
33a control port
37a MII port (first port)
37b MII port (second port)
38a IQ port (first user data port)
38b IQ port (second user data port)

The invention claimed is:

1. A radio equipment which is connected, via a first link, to a first node comprising another radio equipment or a radio equipment controller, and is connected, via a second link, to a second node comprising another radio equipment or a radio equipment controller, which are different from those of the first node, the radio equipment comprising:

a first frame processing unit that performs framing and deframing of a layer 1 frame flowing over the first link, and includes a first port that allows input and output of a higher layer frame;

a second frame processing unit that performs framing and deframing of a layer 1 frame flowing over the second link, and includes a second port that allows input and output of a higher layer frame; and a controller that controls the radio equipment, and includes a control port that allows input and output of a higher layer frame, wherein the first frame processing unit is configured to receive the layer 1 frame including control words via the first link, generate a higher layer frame from the control words included in the layer 1 frame, and output the higher layer frame from the first port to the second port and/or the control port, the second frame processing unit is configured to receive the layer 1 frame including control words via the second link, generate a higher layer frame from the control words included in the layer 1 frame, and output the higher layer frame from the second port to the first port and/or the control port, the controller is configured to output a higher layer frame generated by the controller, from the control port to the first port and/or the second port, the first frame processing unit is provided separately from the second frame processing unit, and the first frame processing unit is capable of outputting a higher layer frame to the second frame processing unit, and the second frame processing unit is capable of outputting a higher layer frame to the first frame processing unit.

2. The radio equipment according to claim 1, further comprising:

a switch connected to the first port, the second port, and the control port, wherein the switch receives the higher layer frame outputted from any of the first port, the second port, and the control port, and determines, based on a destination address included in the higher layer frame, to which of the first port, the second port, and the control port the higher layer frame is to be given.

3. The radio equipment according to claim 2, wherein the controller is configured to generate and output a higher layer frame having an address of another radio equipment as a destination address.

4. The radio equipment according to claim 2, wherein the switch determines, based on a destination MAC address included in the higher layer frame, to which of the first port, the second port, and the control port the higher layer frame is to be given.

5. The radio equipment according to claim 2, wherein the switch determines, based on a destination IP address included in the higher layer frame, to which of the first port, the second port, and the control port the higher layer frame is to be given.

6. The radio equipment according to claim 1, wherein each of the first port and the second port consists of a single port.

7. The radio equipment according to claim 1, wherein the first frame processing unit includes a first user data port that allows the first frame processing unit to exchange user data transmitted by a radio signal, with a radio signal unit that performs transmission/reception of a radio signal, and with the second frame processing unit, and the second frame processing unit includes a second user data port that allows the second frame processing unit to exchange user data with the first frame processing unit.

8. The radio equipment according to claim 1, wherein each of the first link and the second link is a CPRI (Common Public Radio Interface) link.

9. The radio equipment according to claim 1, wherein the layer 1 frame is a layer 1 frame in CPRI.

10. The radio equipment according to claim 1, wherein the higher layer frame is a layer 2 frame.

11. The radio equipment according to claim 1, wherein the higher layer frame is a layer 2 frame for a fast C&M channel in CPRI.

12. A radio base station in which a plurality of radio equipment are cascade connected to a radio equipment controller, and the radio equipment according to claim 1 is used as each of the plurality of radio equipment.

* * * * *